(12) United States Patent
Mo et al.

(10) Patent No.: US 10,062,123 B2
(45) Date of Patent: Aug. 28, 2018

(54) METADATA DRIVEN COLLABORATION BETWEEN APPLICATIONS AND WEB SERVICES

(75) Inventors: Stanley Mo, Portland, OR (US); Claudio J. Ochoa, Cordoba (AR); Gustavo D. Domingo Yaguez, Cordoba (AR); Robert Staudinger, Freilassing (DE); Victor Szilagyi, London (GB)

(73) Assignee: Intel Corporation, Santa Clara, CA (US)

( * ) Notice: Subject to any disclaimer, the term of this patent is extended or adjusted under 35 U.S.C. 154(b) by 147 days.

(21) Appl. No.: 13/997,091

(22) PCT Filed: Dec. 16, 2011

(86) PCT No.: PCT/US2011/065378
§ 371 (c)(1),
(2), (4) Date: May 12, 2014

(87) PCT Pub. No.: WO2013/039540
PCT Pub. Date: Mar. 21, 2013

(65) Prior Publication Data
US 2014/0244766 A1 Aug. 28, 2014

Related U.S. Application Data

(60) Provisional application No. 61/533,454, filed on Sep. 12, 2011.

(51) Int. Cl.
*G06F 15/16* (2006.01)
*G06Q 50/00* (2012.01)
(Continued)

(52) U.S. Cl.
CPC ............. *G06Q 50/01* (2013.01); *G06F 9/541* (2013.01); *G06Q 10/107* (2013.01); *H04L 51/32* (2013.01)

(58) Field of Classification Search
CPC .................................. H04L 29/08; G06F 9/54
(Continued)

(56) References Cited

U.S. PATENT DOCUMENTS 6,721,949 B1  4/2004  Tavoletti et al.
2003/0115358 A1  6/2003  Yun
(Continued)

FOREIGN PATENT DOCUMENTS

CN  1661598 A  8/2005
CN  103765403 A  4/2014
(Continued)

OTHER PUBLICATIONS

International Search Report and Written Opinion received for PCT application No. PCT/US2011/065378, dated Sep. 19, 2012, 9 pages.
(Continued)

*Primary Examiner* — Nicholas Taylor
*Assistant Examiner* — Meng Vang
(74) *Attorney, Agent, or Firm* — Jordan IP Law, LLC

(57) ABSTRACT

Methods and systems may involve identifying metadata associated with a local application, and using an operating system-independent chat protocol to pass the metadata to a remote application. The metadata may include information to be presented to a user of a device executing the remote application, information to be used to locate more information for presentation to the user of the other device, information to be used to coordinate operation of multiple devices, and so forth. In one example, the metadata is passed using a protocol such as XMPP (Extensible Messaging and Presence Protocol).

35 Claims, 5 Drawing Sheets

(51) Int. Cl.
*G06Q 10/10* (2012.01)
*G06F 9/54* (2006.01)
*H04L 12/58* (2006.01)

(58) Field of Classification Search
USPC .......................................................... 709/206
See application file for complete search history.

(56) References Cited

U.S. PATENT DOCUMENTS

| | | | |
|---|---|---|---|
| 2004/0098728 A1* | 5/2004 | Husain | H04L 41/0803 719/313 |
| 2004/0262384 A1 | 12/2004 | Nishida et al. | |
| 2005/0193062 A1 | 9/2005 | Komine et al. | |
| 2007/0143430 A1* | 6/2007 | Johnson | G06F 9/544 709/206 |
| 2008/0194245 A1* | 8/2008 | Leuca | H04W 4/12 455/419 |
| 2008/0313550 A1 | 12/2008 | Shiga et al. | |
| 2009/0234850 A1 | 9/2009 | Kocsis et al. | |
| 2009/0276771 A1* | 11/2009 | Nickolov | G06F 9/4856 717/177 |
| 2011/0055015 A1* | 3/2011 | Gavita | G06Q 30/02 705/14.61 |
| 2011/0202905 A1* | 8/2011 | Mahajan | G06F 8/43 717/140 |
| 2011/0321062 A1* | 12/2011 | Pope | G06Q 30/02 719/318 |
| 2012/0084356 A1* | 4/2012 | Ferdi | H04L 65/1093 709/204 |

FOREIGN PATENT DOCUMENTS

| | | |
|---|---|---|
| EP | 2756409 A1 | 7/2014 |
| JP | 2004334428 A | 11/2004 |
| JP | 2007-255908 A | 10/2007 |
| JP | 2008-310618 A | 12/2008 |
| JP | 2010250725 A | 11/2010 |
| JP | 2014528124 A | 10/2014 |
| KR | 20140063750 A | 5/2014 |
| KR | 10-1608730 B1 | 4/2016 |
| TW | 200500960 A | 1/2005 |
| TW | 201329734 A | 7/2013 |
| TW | I483120 B | 5/2015 |
| WO | 2005/053335 A1 | 6/2005 |
| WO | 2013/039540 A1 | 3/2013 |

OTHER PUBLICATIONS

Office Action received for Taiwan Patent No. 1011311177, dated Oct. 13, 2014, 7 pages of English translation only.
International Preliminary Report on Patentability and Written Opinion received for PCT Patent Application No. PCT/US2011/065378, dated Mar. 20, 2014, 6 pages.
Office Action from Japanese Patent Application No. 2014-529699, dated May 12, 2015, 3 pages includes 2 pages of English translation.
Office Action and Search Report for Chinese Patent Application No. 201180073399.0, dated Sep. 29, 2015, 27 pages including 17 pages of English translation.
European Search Report received for EP Patent Application No. 11872394.9, dated Jan. 8, 2015, 6 pages.
Office Action for Japanese Patent Application No. 2014-529699, dated Mar. 22, 2016, 4 pages including 2 pages of English translation.
Office Action for Chinese Patent Application No. 201180073399.0, dated Mar. 23, 2016, 30 pages including 18 pages of English translation.
Office Action for Chinese Patent Application No. 201180073399.0, dated Jul. 29, 2016, 34 pages including 22 pages of English translation.
Office Action for European Patent Application No. 11872394.9, dated Apr. 3, 2017, 6 pages.
Office Action for Chinese Patent Application No. 201180073399.0, dated Dec. 2, 2016, 35 pages including 23 pages of English translation.
Notice of Reexamination for Chinese Patent Application No. 201180073399.0, dated Oct. 10, 2017, 26 pages including 16 pages of English translation.
Office Action for Chinese Patent Application No. 20118007339.0, dated May 30, 2018, 29 pages including 15 pages of English translation.

* cited by examiner

FIG. 4
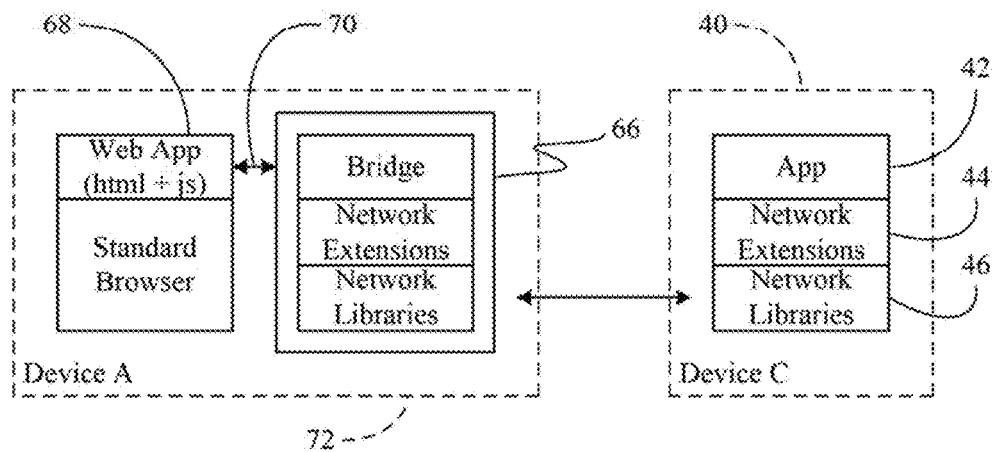
FIG. 7B
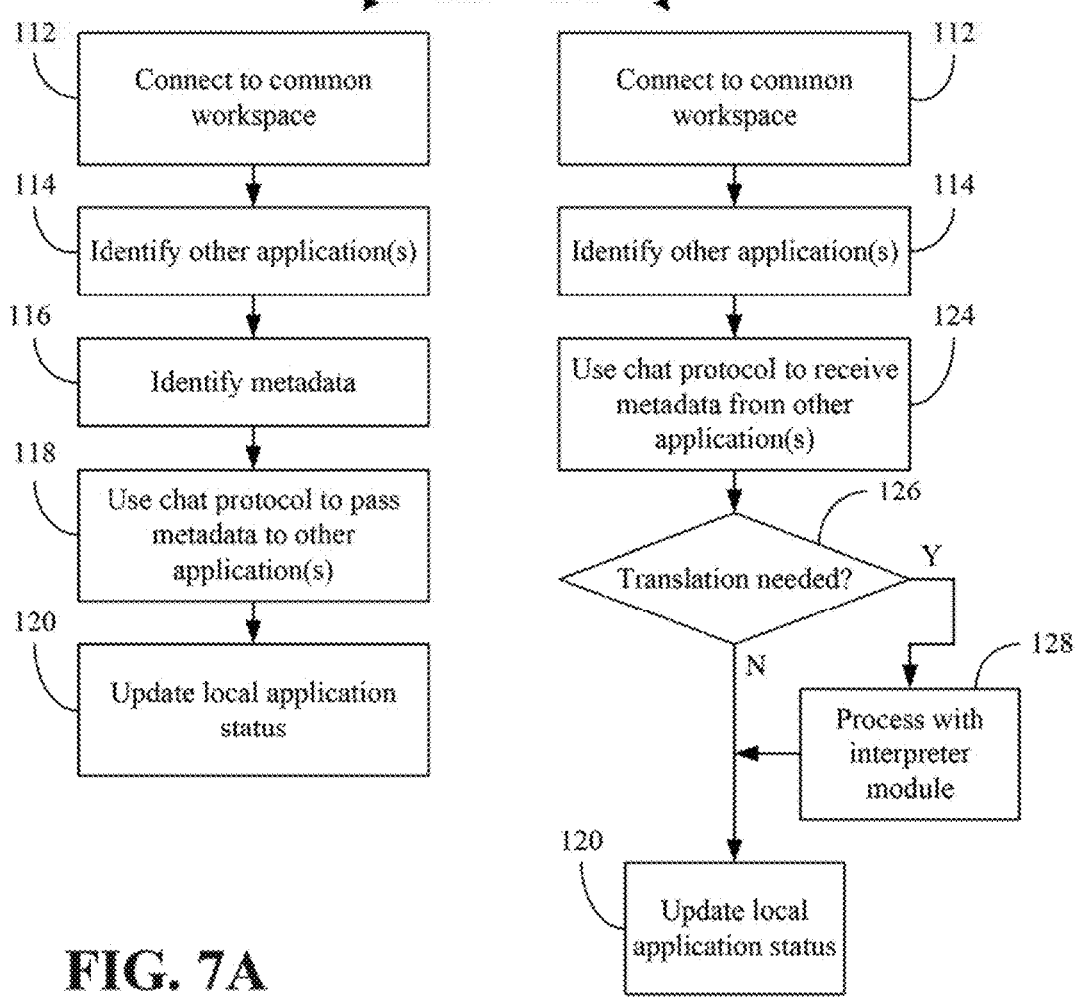
FIG. 7A

FIG. 6
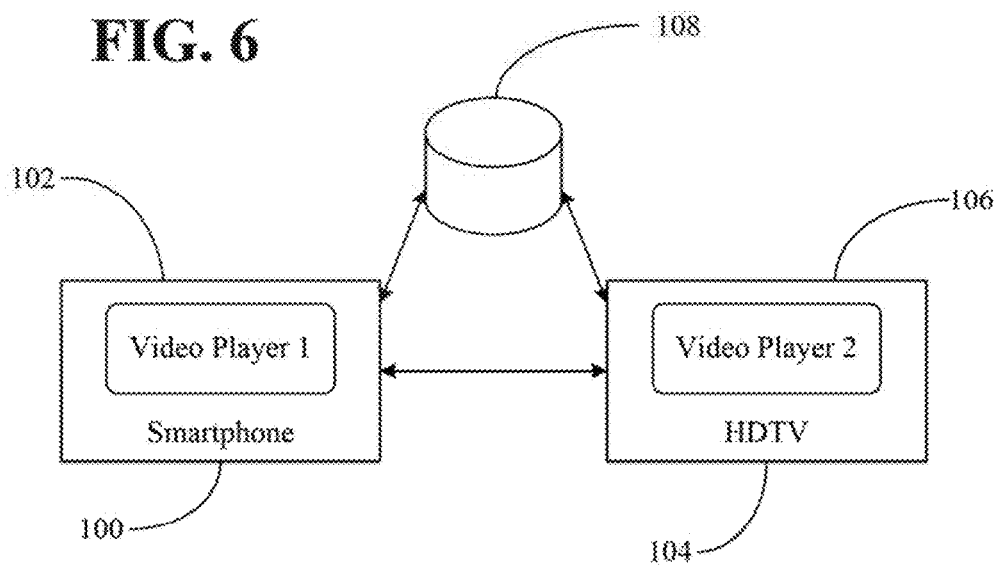
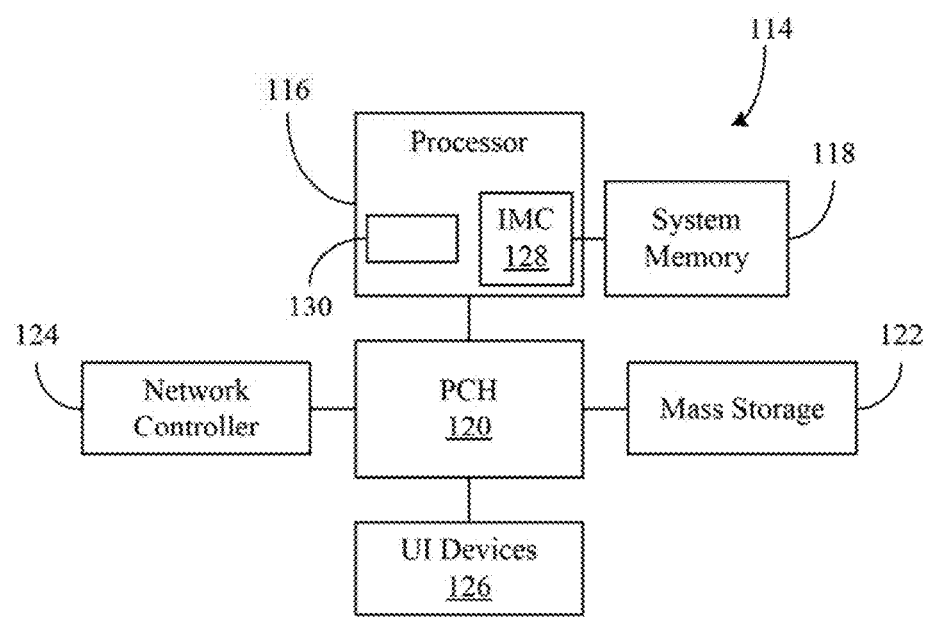
FIG. 8

METADATA DRIVEN COLLABORATION BETWEEN APPLICATIONS AND WEB SERVICES

CROSS-REFERENCE TO RELATED APPLICATIONS

The present application claims the benefit of priority to U.S. Provisional Patent Application No. 61/533,454 filed Sep. 12, 2011.

BACKGROUND

Traditional approaches to connecting software applications to one another may involve the use of operating system (OS) specific application programming interfaces (APIs). For example, a Windows (Microsoft Corp., Redmond, Wash.) based application may need to access proprietary APIs in order to establish a connection and information transfer with a Mac (Apple, Inc., Cupertino, Calif.) application or system. Accordingly, the developer of an application for one OS may need to be aware of the specifics of another OS in order to provide for effective communication between the two applications.

BRIEF DESCRIPTION OF THE DRAWINGS

The various advantages of the embodiments of the present invention will become apparent to one skilled in the art by reading the following specification and appended claims, and by referencing the following drawings, in which:

FIG. 4 is a block diagram of an example of the use of a proxy agent according to an embodiment;

FIG. 6 is a block diagram of an example of an exchange of metadata between homogeneous applications according to an embodiment;

FIG. 7A is a flowchart of an example of a method of using a chat protocol to transfer metadata to a remote application according to an embodiment;

FIG. 7B is a flowchart of an example of a method of using a chat protocol to receive metadata from a remote application according to an embodiment; and FIG. 8 is a block diagram of an example of a system according to an embodiment.

DETAILED DESCRIPTION

Embodiments may include at least one computer accessible storage medium having a set of instructions which, if executed by a processor, cause a computer to identify metadata associated with a local application. The instructions may also cause a computer to use an operating system-independent chat protocol to pass the metadata to a remote application.

Embodiments may also include at least one computer accessible storage medium having a set of instructions which, if executed by a processor, cause a computer to use an operating system-independent chat protocol to receive metadata associated with a remote application resident on a first device. The instructions may also cause a computer to provide the metadata to a local application resident on a second device.

Additionally, embodiments may include a system having a network interface, a metadata module and a chat engine. The metadata module may be configured to identify metadata associated with a local application, and the chat engine may be configured to use an operating system-independent chat protocol to pass the metadata to a remote application via the network interface.

Other embodiments may include at least one computer accessible storage medium having a set of instructions which, if executed by a processor, cause a computer to identify metadata associated with a local application resident on a first device. The instructions may also cause a computer to use an extensible markup language to generate a stanza that includes the metadata, and identify a social networking status of a remote application in a common workspace, wherein the remote application is to be resident on a second device. In addition, the instructions may cause a computer to use an extensible messaging and presence protocol to pass the stanza to the remote application in one or more of a peer-to-peer and a server based architecture, and update a social networking status of the local application in the common workspace based on the stanza.

Embodiments may also include a computer implemented method in which an operating system-independent chat protocol is used to receive metadata associated with a remote application resident on a first device. The method may also involve providing the metadata to a local application resident on a second device.

Figure 1:
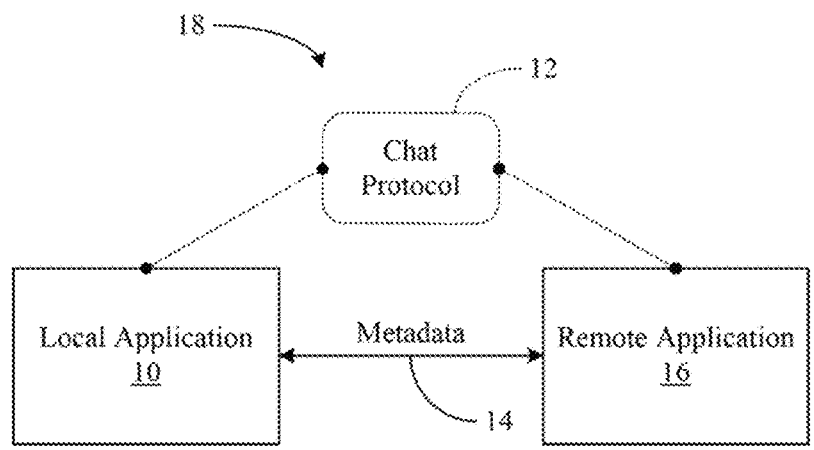
FIG. 1 is a block diagram of an example of an inter-application communication environment according to an embodiment.

Turning now to FIG. 1, a computing environment 18 is shown in which a local application 10 uses a chat protocol 12 to transfer metadata 14 to a remote application 16. The applications 10, 16 may include, for example, an e-mail application, e-book application, calendar application, media player application, etc., or any combination thereof. The applications 10, 16 may, also, originate in a cloud computing infrastructure as a web-service, server-based or locally hosted application or may reside as a standalone, native application on one or more clients. Additionally, the local application 10 may execute on a wide variety of platforms such as, for example, a smart television (TV), server, personal computer (PC), laptop computer, smart tablet, smart-phone, personal digital assistant (PDA), mobile Internet device (MID), media player, in-vehicle-infotainment (WI) system, image capture device, etc. Thus, the metadata 14 may include, for example, e-mail sender and/or recipient information, appointment information, audio and/or video information, web service information, user preference information, keyword information, and so forth. Similarly, the remote application 16 may include, for example, the same (e.g., homogeneous) or different (e.g., heterogeneous) type of application as the local application 10, and may execute on any of the aforementioned or other types of platforms. As will be discussed in greater detail, the illustrated chat protocol 12 is operating system (OS)—independent, and therefore enables heterogeneous and/or homogeneous application messaging and collaboration without developer knowledge of the underlying OS configuration.

Figure 2A:
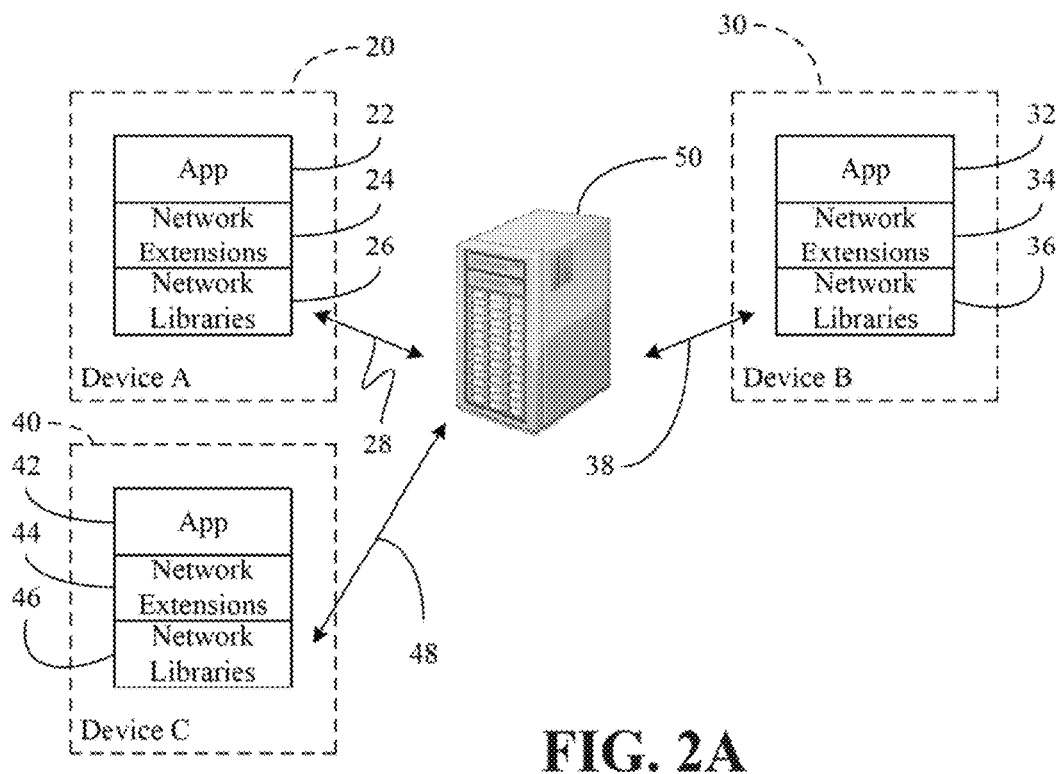
FIG. 2A is a block diagram of an example of a server based mode according to an embodiment.

FIG. 2A shows a server based mode of communicating between applications. In the illustrated example, a first device ("Device A") 20 includes an application 22 that uses one or more network extensions 24 and one or more network libraries 26 to generate outgoing and process incoming chat protocol stanzas 28, wherein the chat protocol stanzas 28 may contain useful metadata. For example, the metadata may indicate an appointment change or a user media preference. Similarly, a second device ("Device B") 30 includes an application 32 that uses one or more network extensions 34 and one or more network libraries 36 to generate and process chat protocol stanzas 38, and a third device ("Device C") 40 includes an application 42 that uses one or more network extensions 44 and one or more network libraries 46 to generate and process chat protocol stanzas 48. In the illustrated example, a server 50 functions as a discovery, authentication and session management platform that locates and verifies the identities of different applications such as, for example, applications 22, 32 and 42, which may reside across platforms and network domains.

For example, one or more of the devices 20, 30, 40 may achieve off-platform communication using wireless technology such as, for example, cellular telephone (e.g., Wideband Code Division Multiple Access/W-CDMA (Universal Mobile Telecommunications System/UMTS), CDMA2000 (IS-856/IS-2000), etc.), Wi-Fi (Wireless Fidelity, e.g., Institute of Electrical and Electronics Engineers/IEEE 802.11-2007, Wireless Local Area Network/LAN Medium Access Control (MAC) and Physical Layer (PHY) Specifications), LR-WPAN (Low-Rate Wireless Personal Area Network, e.g., IEEE 802.15.4-2006), Bluetooth (e.g., IEEE 802.15.1-2005, Wireless Personal Area Networks), WiMax (e.g., IEEE 802.16-2004, LAN/MAN Broadband Wireless LANS), GPS (Global Positioning System), spread spectrum (e.g., 900 MHz), and other RF (radio frequency) technologies. One or more of the devices 20, 30, 40 may also use wired communication (e.g., RS-232 (Electronic Industries Alliance/EIA), Ethernet (e.g., IEEE 802.3-2005), power line communication (e.g., X10, IEEE P1675), USB (e.g., Universal Serial Bus, e.g., USB Specification 3.0, Rev. 1.0, Nov. 12, 2008, USB Implementers Forum), DSL (digital subscriber line), cable modem, T1 connection, etc.), to communicate.

The illustrated server 50 also connects the applications 22, 32, 42, to a common working space based on whether they have an identified relationship (e.g., trust) with one another. The applications 22, 32, 42, may then use profiles to identify themselves and each others' status as being available, away, busy, etc. Use of statuses allows applications to be active in their communications with one another and also provides a "passive" model in which an application can log on and leave a message. The message may be transferred to an "unavailable" or "away" target application when it reconnects and changes its status to "available," for example. Moreover, the illustrated applications 22, 32, 42, may communicate 1:1, 1:many, or many:many using the same paradigms as a chat/instant messaging (IM) session. For example, each application 22, 32, 42, may use a code module to "emulate" a person or object within the chat system, as well as an interpreter module to support the generation and processing of the stanzas 28, 38, 48. As will be discussed in greater detail, the chat protocol may be based on a well defined protocol such as, for example, XMPP (Extensible Messaging and Presence Protocol, Internet Engineering Task Force) and the stanzas 28, 38, 48, may be structured using XML (Extensible Markup Language, e.g., XML 1.0 (Fifth Edition), W3C Recommendation 26 Nov. 2008).

Figure 2B:
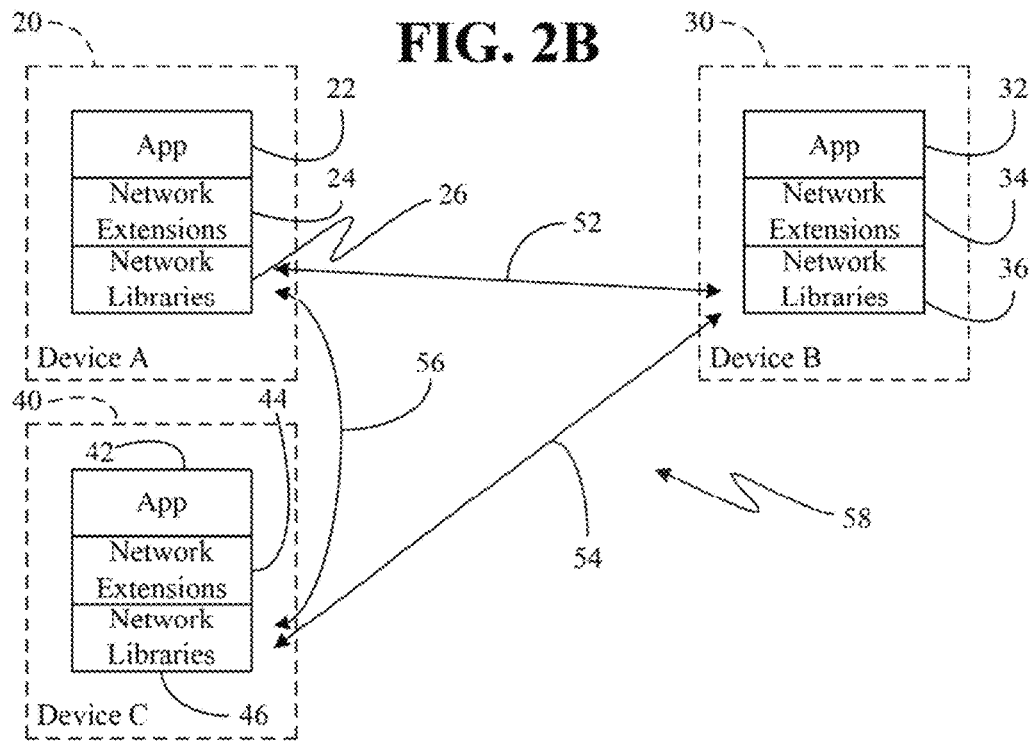
FIG. 2B is a block diagram of an example of a serverless (peer-to-peer) mode according to an embodiment.

FIG. 2B shows an alternative "serverless" architecture 58 in which the devices 20, 30, 40, exchange stanzas 52, 54 and 56, directly with one another in a peer-to-peer (P2P) configuration. The illustrated approach may be deployed instead of the server based approach, or in conjunction with the server based approach (e.g., in a hybrid architecture).

Figure 3:
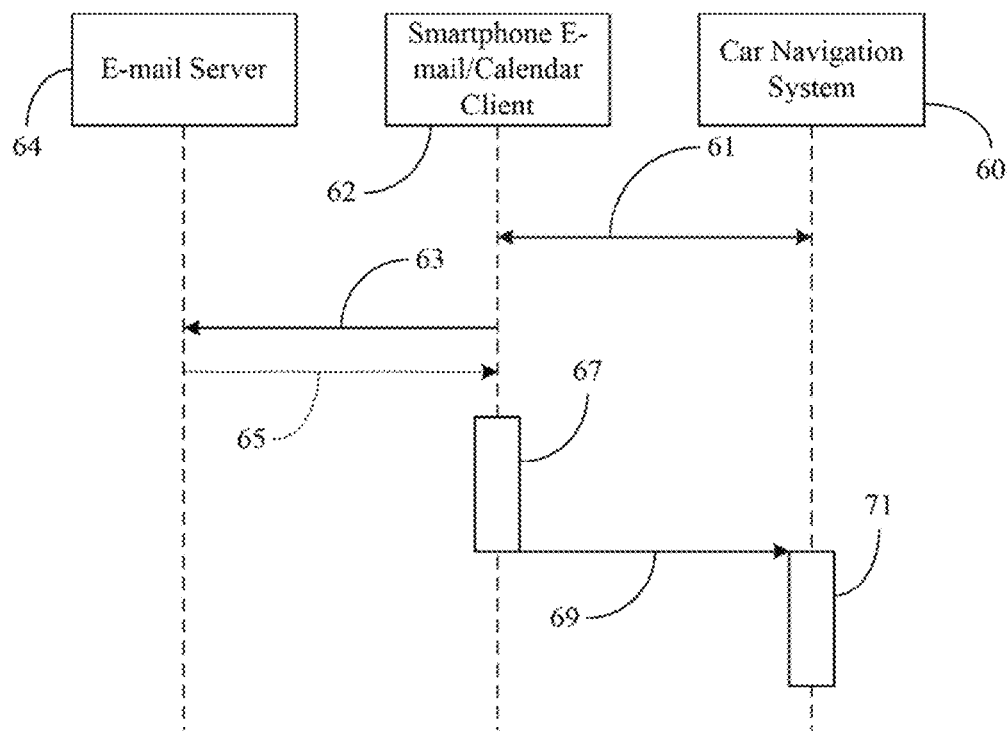
FIG. 3 is a messaging sequence diagram of an example of an exchange of metadata between heterogeneous applications according to an embodiment.

Turning now to FIG. 3, a heterogeneous application interaction is shown. In the illustrated example, a user is driving a car with a navigation system 60 of an in-vehicle-infotainment (IVI) system. The user may be on the way to an appointment at a particular destination (e.g., downtown), wherein the navigation system 60 is guiding the user to that location. On the user's smartphone, however, an email/calendar application 62 receives a notice that the meeting location has been moved from the current destination to a new one. Rather than requiring the user to manually update the car navigation system 60 (e.g, stopping the car, potentially taking life-threatening actions in a moving car), the illustrated approach uses an OS-independent chat protocol to transfer metadata between the smartphone and the navigation system 60.

In particular, the smartphone and the car IVI platform may be connected, for example, via Wi-Fi, Bluetooth or a tether, wherein XMPP-based discovery may be conducted over the connection as shown by arrow 61. Once the smartphone checks (via push or pull process) an e-mail server 64 along arrow 63 and receives the calendar alert along arrow 65 (e.g., via standard protocol, POP3/Post Office Protocol, Ver. 3), the smartphone email/calendar application 62 connects to the application running on the car navigation system 60 and uses a parsing and updating module 67 to pass the update along arrow 69 as an XML stanza with metadata reflecting the location change. For example, the XML stanza may include: >>CarNavigation, <Current Address>, <New Address>, <Change?>, <Comments "Meeting Name">. Thus, the software of the navigation system 60 does not need to have a calendar or email app in this case—it may use an update module 71 to parse the calendar data it receives directly into the navigation interface, and inform the driver that a change in location has been made and that the destination has been updated.

FIG. 4 demonstrates that in cases where a simpler "terminal" style model of communication is desired, a web-socket interface or an NPAPI (Netscape Plug-in API)-based plug-in may be used to provide access to browser applications and services that may not have the complete infrastructure for discovery and authentication through the chat protocol. In the illustrated model, a web application 68 connects to a proxy agent 66 via a web socket 70, wherein the proxy agent 66 acts on behalf of the device 72. The illustrated approach presumes an already established trust environment between the proxy agent 66 and device 72, and it allows for full communications and metadata messaging among the devices 40, 72 and with other provisioned platforms on the chat protocol network.

Figure 5A:
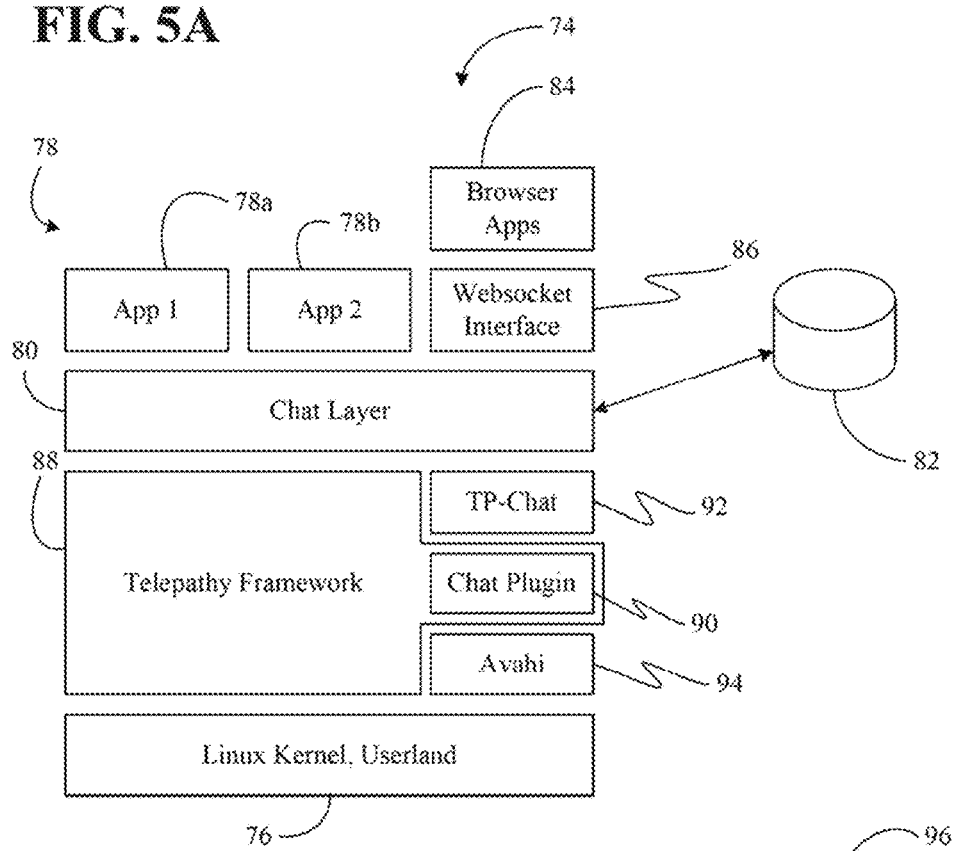
FIG. 5A is a block diagram of an example of a chat protocol stack according to an embodiment.

FIG. 5A shows a chat protocol stack 74 that may be used to transfer metadata between applications. In general, the illustrated chat protocol stack 74 has a chat layer 80 that is independent of an OS layer 76 and can be implemented much more easily than traditional protocols. In particular, one or more applications 78 (78a, 78b) reside above the chat layer 80, which may use a library 82 such as, for example, an independent software vendor (ISV) extensible XML command library (e.g., having profiles such as media player profiles, TV profiles, etc.), to construct and interpret XML stanzas. The chat layer 80 may be implemented with languages such as, for example, C, C++, HTML5 (Hypertext Markup Language 5), JSON (JavaScript Object Notation), and so forth. One or more browser applications 84 may also use a websocket interface (e.g., embedded webserver) 86 to connect to the chat layer 80, as already discussed. The illustrated chat layer 80 interfaces with a telepathy framework 88, which uses a chat plug-in 90 to obtain network extensions for the chat protocol engine and shares the telepathy layer with a telepathy-chat module 92 and a zero configuration networking module 94 such as, for example, Avahi. In one example, the zero configuration networking module 94 functions as the discovery layer for P2P implementations.

Figure 5B:
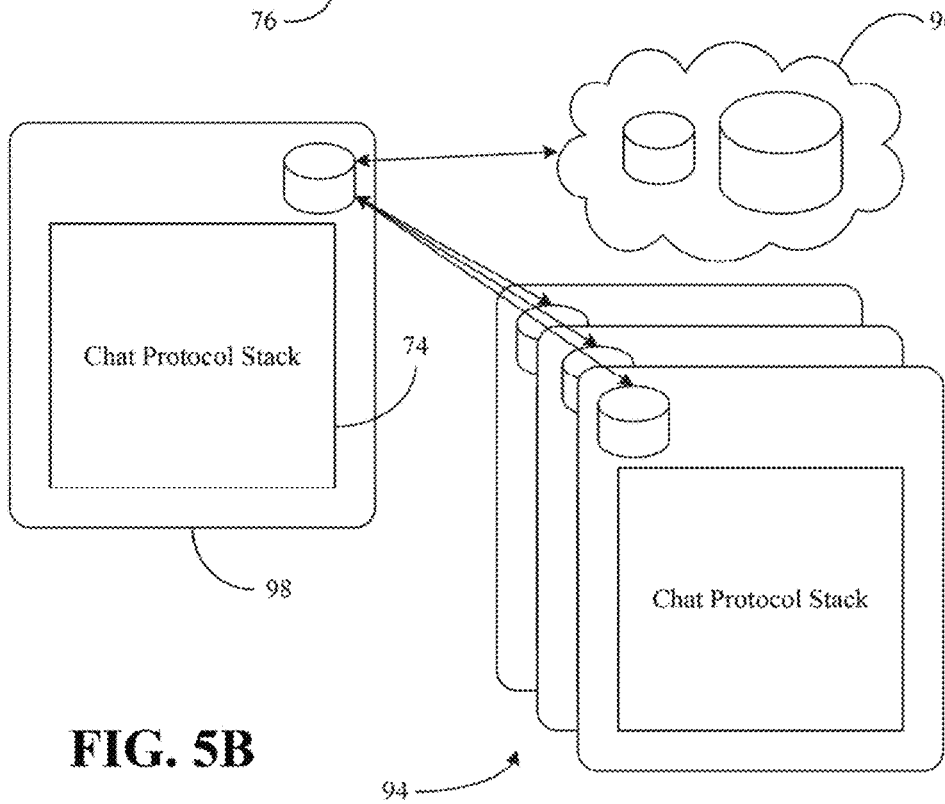
FIG. 5B is a block diagram of an example of the deployment of a chat protocol stack in a cloud computing infrastructure according to an embodiment.

FIG. 5B demonstrates that the chat protocol stack 74 can also support a more structured server-client topology, which includes connections through a cloud 96 that allows for multiple servers 94 to identify and connect to one another. In such a configuration, it is possible for a trusted cloud server such as server 98 to act as an entry/authentication point for platforms/devices and to provide a trusted channel into the home, for instance. In one example, the server 98 is discoverable and redundant so that it can function as a "lead" platform with fallback to other servers in case of failure. Thus, this kind of secured service may provide a smartphone with a trusted path from 3G (on the go) to cable (backbone from cloud to home) to Wi-fi (inside the home). Simply put, the illustrated infrastructure is not sensitive to various communications topologies, typically using an IP (Internet protocol) communications path over whatever transport mechanism is available (e.g., Wi-fi, 3G, 4G, Bluetooth).

Turning now to FIG. 6, a chat connection between homogenous applications is shown. In the illustrated example, a smartphone 100 includes an application such as a first video player ("Video Player 1") 102, and a high definition television (HDTV) 104 includes an application such as a second video player ("Video Player 2") 106. Once the devices and video players 102, 106 have been authenticated to the chat network, the actual application-to-application communication may be conducted with a salutary stanza and metadata arguments passed from the first video player 102 to the second video player 106 (or to many applications). For example, the stanza generated by the first video player 102 may include:

>>MoviePlayer, <Patton>, <01:23:00:00>, <Play>

The second video player 106 may then retrieve the requested movie locally or initiate a stream from a movie web service such as service 108. Example movie web services include, but are not limited to, Amazon Plus, Netflix, DLNA (Digital Living Network Alliance), and so forth. In particular, the second video player 106 may retrieve content that is best formatted for the HDTV 104 (e.g., 1080p, 7.1 Dolby), rather than content that may be more suited for the smartphone 100 (e.g., 720p, stereo). The response of the second video player 106 to the first video player 102 may include:

>>Success

At that juncture, the video players 102, 106 may break off any further communications, but the smartphone 100 and HDTV 104 may remain configured to the chat server. The second video player 106 of the HDTV 104 may set its profile status to "busy" to signify that it is occupied, and the first video player 102 of the smartphone 100, that was previously set to "busy", now changes it status to "available" to facilitate communications with any other interested application. Thus, the video players 102, 104, can be viewed as applications that may engage in "social networking" activities such as updating status pages, viewing the status pages of other applications, and chatting (e.g., "machine chat") with one another, transparently to the user.

FIG. 7A shows a method 110 of using a chat protocol to send metadata from one application on a first device to another application on a second device. The method 110 may be implemented as a set of executable logic instructions stored in a machine- or computer-readable storage medium such as random access memory (RAM), read only memory (ROM), programmable ROM (PROM), flash memory, firmware, microcode, etc., in configurable logic such as, for example, programmable logic arrays (PLAs), field programmable gate arrays (FPGAs), complex programmable logic devices (CPLDs), in fixed-functionality hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 110 may be written in any combination of one or more programming languages, including, but not limited to, an object oriented programming language such as C++ or the like and conventional procedural programming languages, such as the "C" programming language or similar programming languages. Moreover, various aspects of the method 110 could be implemented as embedded logic of a processor using any of the aforementioned circuit technologies.

Processing block 112 provides for connecting to a common workspace and illustrated block 114 identifies one or more other applications in the workspace. Identifying the other applications may include checking the status of the other applications, as already discussed. Metadata may be identified at block 116, wherein the metadata may include information to be presented to a user of a device executing the other application, information to be used to locate more information for presentation to the user of the other device, information to be used to coordinate operation of multiple devices, and so forth. Illustrated block 118 uses a chat protocol to pass the metadata to the other applications. The chat protocol may be implemented using XMPP and may be entirely OS-independent. The status of the local application may be updated at block 120 according to the metadata/stanza exchange, as already discussed.

FIG. 7B shows a method 122 of using a chat protocol to receive metadata from a remote application. Processing block 112 provides for connecting to a common workspace and illustrated block 114 identifies one or more other applications in the workspace, as already discussed. A chat protocol may be used at block 124 to receive metadata from the other application. Block 126 provides for determining whether translation of the received metadata is needed. If so, the metadata may be processed with an interpreter module at block 128. In this regard, an XML message server may be used to assist developers and applications by hosting the specific commands and arguments which can be understood by different applications. This server may be open for all developers and applications to see, and may be extensible by the developer so that it can also be used as a translation platform where different syntaxes may exist for the same action. For instance, on a television set; <change channel 4> vs <go to NBC> vs <watch "The Simpsons"> may accomplish the same thing and so may be cross-referenced to provide an interpretation service for applications and developers. Illustrated block 120 provides for updating the status of the local application based on the metadata/stanza exchange.

Turning now to FIG. 8, a computing system 114 is shown in which metadata may be exchanged with other systems via a chat protocol. In the illustrated example, the computing system 114 has a processor 116, system memory 118, a platform controller hub (PCH) 120, mass storage (e.g., hard disk drive/HDD, optical disk, flash memory) 122, a network interface/controller 124, one or more user interface (UI) devices 126 and various other controllers (not shown). The system 114 may have a media consumption capability and may therefore be part of, for example, a TV, laptop, smart tablet, smart phone, personal computer (PC), server, workstation, etc. Indeed, the system 114 may be partially or totally incorporated into one or more devices such as the devices 20, 30, 40 (FIGS. 2A and 2B), already discussed. Thus, the processor 116 may include one or more processor cores capable of executing a set of stored logic instructions, and an integrated memory controller (IMC) 128 configured to communicate with the system memory 118. The system memory 118 may include, for example, dynamic random access memory (DRAM) configured as one or more memory modules such as, for example, dual inline memory modules (DIMMs), small outline DIMMs (SODIMMs), etc.

In the illustrated example, the processor 116 is configured to execute logic 130 that identifies metadata associated with a local application on the system 114, and uses an OS-independent chat protocol to pass the metadata to remote applications resident on other devices. The logic 130 may also use the OS-independent chat protocol to receive metadata associated with remote applications resident on other devices, and provide the metadata to a local application on the system 114. Thus, for example, the logic 130 may include a metadata module and/or a chat engine that implement one or more aspects of the method 110 (FIG. 7A) and the method 112 (FIG. 7B), already discussed.

The illustrated PCH 120, sometimes referred to as a Southbridge of a chipset, functions as a host device and may communicate with the network controller 124, which could provide off-platform wireless communication functionality for a wide variety of purposes such as, for example, cellular telephone, Wi-Fi, LR-WPAN, Bluetooth, WiMax, GPS, spread spectrum, and other RF telephony purposes. The network controller 124 may also provide off-platform wired communication functionality. The UI (e.g., touch screen, liquid crystal display/LCD, light emitting diode/LED, keyboard, mouse, etc.) devices 126 may be capable of enabling a user to interact with and perceive information from the system 114.

Certain aspects of embodiments of the present invention may be implemented using hardware, software, or a combination thereof and may be implemented in one or more computer systems or other processing systems. Program code may be applied to the data entered using an input device to perform the functions described and to generate output information. The output information may be applied to one or more output devices. One of ordinary skill in the art may appreciate that embodiments may be practiced with various computer system configurations, including multi-processor systems, minicomputers, mainframe computers, and the like. Embodiments may also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the methods described herein. Alternatively, the methods may be performed by specific hardware components that contain hard-wired logic for performing the methods, or by any combination of programmed computer components and custom hardware components. The methods described herein may be provided as a computer program product that may include at least one machine readable medium having stored thereon instructions that may be used to program a processing system or other electronic device to perform the methods. The term "machine readable medium" or "machine accessible medium" used herein shall include any medium that is capable of storing or encoding a sequence of instructions for execution by the machine and that causes the machine to perform any one of the methods described herein. The terms "machine readable medium" and "machine accessible medium" may accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system to cause the processor to perform an action or produce a result.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal to or chronological significance unless otherwise indicated.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

We claim:

1. At least one non-transitory computer readable storage medium comprising a set of instructions which, if executed by a processor, cause a computer to:
  identify metadata associated with a local application resident on a first device;
  use an extensible markup language to generate a stanza that includes the metadata;
  identify a social networking status of a remote application in a common workspace, wherein the remote application is resident on a second device;
  use an extensible messaging and presence protocol to pass the stanza to the remote application in one or more of a peer-to-peer and a server based architecture;
  terminate communication between the local application and the remote application based upon a reply, indicating that an instruction in the stanza was carried out successfully by the remote application, received by the local application from the remote application, wherein the reply is provided in response to the stanza; and update a social networking status of the local application in the common workspace based on the stanza and the reply to indicate that the local application is available to facilitate communication with one or more other applications, wherein the local application uses a first profile to identify an operational status of the remote application, and a second profile to indicate an operational status of the local application to the remote application, wherein the operational status of one or more of the first profile or the second profile includes a passive mode in which messages intended for an unavailable target application resident on one or more of the first device or the second device are stored and subsequently transferred upon the unavailable target application becoming available, and wherein the social networking status of the local application corresponds to a user set status on the local application indicating a user availability to interact with communications received by the local application.

2. The medium of claim 1, wherein the metadata includes one or more of e-mail information, appointment information, audio information, video information, web service information, user preference information and keyword information.

3. The medium of claim 1, wherein the first device and the second device include one or more of a smart television, a server, a personal computer, a laptop computer, a smart tablet, a smartphone, a personal digital assistant, a mobile Internet device, a media player, an in-vehicle-infotainment system and an image capture device.

4. The medium of claim 1, wherein the local application and the remote application include one or more of an e-mail application, an e-book application, a calendar application, a navigation application and a media player application.

5. At least one non-transitory computer readable storage medium comprising a set of instructions which, if executed by a processor, cause a computer to:

use an operating system-independent chat protocol to receive metadata associated with a remote application resident on a first device;

provide the metadata to a local application resident on a second device;

identify a social networking status of the remote application; and carry out, by the local application, an instruction in the metadata, wherein in response to the instruction being carried out successfully by the local application, the computer is configured to:

transmit a reply by the local application to the remote application indicating that the instruction was carried out successfully, terminate communication between the local application and the remote application, and update a social networking status of the local application in a common workspace based on the metadata to indicate that the local application is busy, wherein the local application uses a first profile to identify an operational status of the remote application, and a second profile to indicate an operational status of the local application to the remote application, wherein the operational status of one or more of the first profile or the second profile includes a passive mode in which messages intended for an unavailable target application resident on one or more of the first device or the second device are stored and subsequently transferred upon the unavailable target application becoming available, and wherein the social networking status of the local application corresponds to a user set status on the local application indicating a user availability to interact with communications received by the local application.

6. The medium of claim 5, wherein the instructions, if executed, cause a computer to:

receive an extensible markup language stanza that includes the metadata, wherein the chat protocol is an extensible messaging and presence protocol; and determine whether to translate the stanza.

7. The medium of claim 6, wherein the instructions, if executed, cause a computer to use an extensible markup language message server to translate the stanza.

8. The medium of claim 6, wherein the instructions, if executed, cause a computer to:

update the social networking status of the local application based on the stanza.

9. The medium of claim 8, wherein the social networking status of the remote application is identified in the common workspace, and the social networking status of the local application be updated in the common workspace.

10. The medium of claim 5, wherein the metadata includes one or more of e-mail information, appointment information, audio information, video information, web service information, user preference information and keyword information.

11. At least one non-transitory computer readable storage medium comprising a set of instructions which, if executed by a processor, cause a computer to:

identify metadata associated with a local application resident on a first device;

identify a social networking status of a remote application, wherein the remote application is resident on a second device;

use an operating system-independent chat protocol to pass the metadata to the remote application;

terminate communication between the local application and the remote application based upon a reply, indicating that an instruction in the metadata was carried out successfully by the remote application, received by the local application from the remote application, wherein the reply is provided in response to the metadata; and update a social networking status of the local application in a common workspace based on the reply to indicate that the local application is available to facilitate communication with one or more other applications, wherein the local application uses a first profile to identify an operational status of the remote application, and a second profile to indicate an operational status of the local application to the remote application, wherein the operational status of one or more of the first profile or the second profile includes a passive mode in which messages intended for an unavailable target application are stored and subsequently transferred upon the unavailable target application becoming available, and wherein the social networking status of the local application corresponds to a user set status on the local application indicating a user availability to interact with communications received by the local application.

12. The medium of claim 11, wherein the instructions, if executed, cause a computer to use an extensible markup language to generate a stanza that includes the metadata, wherein the stanza is passed to the remote application and the chat protocol is an extensible messaging and presence protocol.

13. The medium of claim 12, wherein the instructions, if executed, cause a computer to:
update the social networking status of the local application based on the stanza.

14. The medium of claim 13, wherein the social networking status of the remote application is identified in the common workspace, and the social networking status of the local application is updated in the common workspace.

15. The medium of claim 11, wherein the first device and the second device include one or more of a smart television, a server, a personal computer, a laptop computer, a smart tablet, a smartphone, a personal digital assistant, a mobile Internet device, a media player, an in-vehicle-infotainment system and an image capture device.

16. The medium of claim 11, wherein the metadata includes one or more of e-mail information, appointment information, audio information, video information, web service information, user preference information and keyword information.

17. The medium of claim 11, wherein the local application and the remote application include one or more of an e-mail application, an e-book application, a calendar application, a navigation application and a media player application.

18. The medium of claim 11, wherein the metadata is passed to the remote application in a peer-to-peer architecture.

19. The medium of claim 11, wherein the metadata is passed to the remote application in a server based architecture.

20. A system comprising:
one or more processors configured to execute:
a network interface;
a metadata module configured to identify metadata associated with a local application resident on the system; and
a chat engine configured to:
identify a social networking status of a remote application, wherein the remote application is resident on a second device,
use an operating system-independent chat protocol to pass the metadata to the remote application via the network interface,
terminate communication between the local application and the remote application based upon a reply, indicating that an instruction in the metadata was carried out successfully by the remote application, received by the local application from the remote application, wherein the reply is provided in response to the metadata, and
update a social networking status of the local application in a common workspace based on the reply to indicate that the local application is available to facilitate communication with one or more other applications,
wherein the local application is to use a first profile to identify an operational status of the remote application, and a second profile to indicate an operational status of the local application to the remote application,
wherein the operational status of one or more of the first profile or the second profile includes a passive mode in which messages intended for an unavailable target application are stored and subsequently transferred upon the unavailable target application becoming available, and wherein the social networking status of the local application corresponds to a user set status on the local application indicating a user availability to interact with communications received by the local application.

21. The system of claim 20, wherein the chat engine is configured to use an extensible markup language to generate a stanza that includes the metadata, wherein the stanza is passed to the remote application and the chat protocol is an extensible messaging and presence protocol.

22. The system of claim 21, wherein the chat engine is configured to update the social networking status of the local application based on the stanza.

23. The system of claim 22, wherein the social networking status of the remote application is identified in a common workspace, and the social networking status of the local application is updated in the common workspace.

24. The system of claim 20, further including the local application.

25. The system of claim 24, further including one or more of a smart television, a server, a personal computer, a laptop computer, a smart tablet, a smartphone, a personal digital assistant, a mobile Internet device, a media player, an in-vehicle-infotainment system and an image capture device.

26. The system of claim 20, wherein the metadata includes one or more of e-mail information, appointment information, audio information, video information, web service information, user preference information and keyword information.

27. The system of claim 20, wherein the local application and the remote application include one or more of an e-mail application, an e-book application, a calendar application, a navigation application and a media player application.

28. The system of claim 20, wherein the metadata is passed to the remote application in a peer-to-peer architecture.

29. The system of claim 20, wherein the metadata is passed to the remote application in a server based architecture.

30. A computer implemented method comprising:
using an operating system-independent chat protocol to receive metadata associated with a remote application resident on a first device;
providing the metadata to a local application resident on a second device;
identifying a social networking status of the remote application;
carrying out, by the local application, an instruction in the metadata; and
in response to the instruction being carried out successfully by the local application,
transmitting a reply by the local application to the remote application indicating that the instruction was carried out successfully,
terminating communication between the local application and the remote application, and
updating a social networking status of the local application in a common workspace based on the metadata to indicate that the local application is busy,
wherein the local application uses a first profile to identify an operational status of the remote application, and a second profile to indicate an operational status of the local application to the remote application,
wherein the operational status of one or more of the first profile or the second profile includes a passive mode in which messages intended for an unavailable target application resident on one or more of the first device or the second device are stored and subsequently transferred upon the unavailable target application becoming available, and wherein the social networking status of the local application corresponds to a user set status on the local application indicating a user availability to interact with communications received by the local application.

31. The method of claim 30, further including:

receiving an extensible markup language stanza that includes the metadata, wherein the chat protocol is an extensible messaging and presence protocol; and determining whether to translate the stanza.

32. The method of claim 31, further including using an extensible markup language message server to translate the stanza.

33. The method of claim 31, further including:

updating the social networking status of the local application based on the stanza.

34. The method of claim 33, wherein the social networking status of the remote application is identified in the common workspace, and the social networking status of the local application is updated in the common workspace.

35. The method of claim 30, wherein the metadata includes one or more of e-mail information, appointment information, audio information, video information, web service information, user preference information and keyword information.

* * * * *